United States Patent [19]

Goehner

[11] Patent Number: 5,496,134
[45] Date of Patent: Mar. 5, 1996

[54] SLIDING SKID RING FOR PIPE FEEDTHROUGHS

[76] Inventor: Siegfried Goehner, Christophstrasse 15, D-72116 Moessingen, Germany

[21] Appl. No.: 241,085

[22] Filed: May 11, 1994

[30] Foreign Application Priority Data

May 11, 1993 [DE] Germany .............. 43 15 424.7

[51] Int. Cl.[6] .............. F16L 1/00; F16L 1/024; F16L 1/06
[52] U.S. Cl. .............. 405/154; 138/114; 166/241.1; 405/184; 24/339
[58] Field of Search .............. 405/154–158; 285/133.1, 421, 138; 138/113, 114; 166/241.1, 241.2; 24/339, 555

[56] References Cited

U.S. PATENT DOCUMENTS

| | | | |
|---|---|---|---|
| 3,754,780 | 8/1973 | Pogonowski | 285/421 X |
| 3,894,780 | 7/1975 | Broussard | 285/421 X |
| 4,147,383 | 4/1979 | Schluter | 285/421 X |
| 4,165,111 | 8/1979 | Zanichelli . | |
| 4,896,701 | 1/1990 | Young | 138/113 X |
| 5,018,260 | 5/1991 | Ziu | 285/133.1 X |

FOREIGN PATENT DOCUMENTS

| | | |
|---|---|---|
| 2368661 | 10/1977 | France . |
| 7611150 | 4/1976 | Germany . |
| 8009131 | 4/1980 | Germany . |
| 3130599 | 8/1981 | Germany . |

*Primary Examiner*—Dennis L. Taylor
*Attorney, Agent, or Firm*—Eugene E. Renz, Jr.

[57] ABSTRACT

Sliding skid ring for a pipe member, to be laid underground inside a jacket pipe, consisting of at least two segments, connected to each other by tightening elements, held under pretension against the pipe member in a nonpositive manner, and carry outward-pointing sliding skids. The sliding skid ring is comprised of several identical segments. Each segment is provided on one side with a radial section in the form of one of more tabs and, on the opposite side, with another radial section in the form of a closure part having one or more insertion slots designed to accept the tabs. The tabs of an adjacent segment is engaged in the slots. The tabs have a plurality of parallel and equidistant grooves, which are at a slant of a few degrees to the axial direction. The closure part has, in the engagement area of the tabs, an axially oriented guide grooves for a tongue-like wedge, which is inserted therein. The wedge has grooves, which are oriented to correspond with the grooves in the tabs and are in engagement therewith. The wedge is driven axially into the guide grooves until the two adjacent segments are tightened together and the sliding skid ring is thus held pressed against the pipe member.

5 Claims, 7 Drawing Sheets

SLIDING SKID RING FOR PIPE FEEDTHROUGHS

FIELD OF THE INVENTION

The present invention relates broadly to devices and systems for installing pipe lines or the like. More specifically, the present invention relates to improvements in so-called sliding skid rings for use in assembling gas lines or waste water pipes in underground jacket pipes.

BACKGROUND OF THE INVENTION

Sliding skid rings of the type to which the present invention relate are required in the installation of pipes such as gas lines or waste water pipes into jacket pipes and to support them therein without metallic contact between the gas lines and jacket pipes. This type of installation for laying underground pipes has the advantages that it obviates the need for expensive excavation work. This type of installation is particularly advantages in situations where it is impossible or extremely labor intensive to excavate the area where the pipes are to be laid, such as when pipes are to be laid underneath the surface of a reinforced roadway. In these installations, vertical shafts are dug at the beginning and end of the segment and a bore hole is then made connecting the two shafts. The bore hole can be dug out by means of a compressed air tool, for example. A jacket pipe is then inserted into the bore hole so formed which functions to stabilize the bore hole and to hold the actual utility pipeline. The utility pipeline is pushed into the jacket pipe and to this end, is provided with sliding skid rings which attach to the external periphery of the utility pipeline at predetermined intervals such as every meter, for example.

Prior to the present invention, sliding skid rings typically consisted of a polymeric material such as polyethylene because it possessed the desired sliding properties and also was able to center the utility pipeline inside the jacket pipe. These materials also reliably prevent metallic contact between the jacket pipe and the utility pipeline which is important to ensure no corrosion phenomena will occur.

Presently, sliding skid rings of the type presently known are in the form of half-shells or quarter-segments which are then fastened together by high-grade threaded steel bolts. This assembly has certain disadvantages and drawbacks. For example, they tend to corrode over a period of time. Furthermore, the on-site installation of sliding skid rings is rather difficult because the production of screws/nut connections is relatively labor intensive. Furthermore, these screw/nut connections are rather difficult to connect speedily since the workmen are usually wearing cumbersome work gloves. In short, dealing with a relatively large number of small parts is rather tedious, time consuming and counterproductive.

Sliding skid rings which are equipped with solid plastic sliding skids are also known and typically are used for pipes with nominal diameters of more than 500 CMS. It has been known that these skid rings are also difficult to install since they require complicated pliers or clamping shoes for tightening. It has also been observed that the clamping action of these skid rings tend to diminish over a period of time and present the danger of the sliding skid ring coming loose.

SUMMARY OF THE INVENTION

With the foregoing in mind, it is object of the present invention to provide a skid ring characterized by novel features of construction and arrangement which obviates the disadvantages and drawbacks of the prior art skid tings discussed above. More particularly, the present invention was designed to provide a sliding skid ring which could be mounted quickly and reliably without the need to keep a large number of small parts on hand and is fully functionally without the need for any metal parts whatsoever. To this end, the skid ring of the present invention comprises several identical segments, each provided on one side with a radial section in the form of one or more tabs and, on the opposite side, with another radial section in the form of a closure part with one or more insertion slots designed to accept the tabs. The tabs of adjacent segment are engaged in the slots. The tabs have a plurality of parallel and equidistant grooves, which are at a slant of a few degrees to the axial direction; whereas the closure part has, in the engagement area of the tabs, an axially oriented guide groove for a tongue-like wedge, which is inserted therein. The wedge has grooves, which are oriented to correspond with the grooves in the tabs and are in engagement therewith. The wedge is driven axially into the guide groove until the two adjacent segments are tightened together and the sliding skid ring is thus held pressed against the pipe.

Thus, the invention is based on the concept of building a sliding skid ring comprised of a plurality of identical segments which carry sliding skids, and which at the same time has connecting elements facilitating insertion of the segments into one another and tightening them together. By means of appropriate catches, the sliding skid ring is first assembled loosely around the pipe, then by driving a wedge into the connecting area between two segments, the segments are brought towards each other and held under pretension on the pipe in a non-positive manner. Thus, it can be appreciated that installation is accomplished without complicated aids because the only step required is to drive wedges into the connecting areas with a suitable tool such as a hammer. This requires relatively little installation skill. Furthermore, the pretension in the system can easily be increased or built back up again if loosening occurs.

In accordance with the present invention, the sliding skid ring is constructed entirely of non-metallic materials and in accordance with a preferred embodiment, the segments are made of polyethylene and the wedges are made of a glass fiber-reinforced polyamide.

The preferred configuration has certain advantages. For example, since the individual segments are made of polyethylene, they are elastically deformable within certain limits. Consequently, it is not necessary for the curvature of the segments to fit the diameter of the pipe precisely. Instead, it is sufficient for the curvature to be merely approximately correct. This means that it is possible to fit the segment to pipes of different diameters and therefore, pipes of a wide range of diameters can be provided with rings merely by assembling the required number of identical segments.

In accordance with another specific feature of the present invention, the wedges to be driven in and the sections of the segments serving as connecting elements have recesses in the form of lines or grooves, which form an acute angle of a few degrees to the direction in which the wedges are driven in. Consequently, the wedge and the segment engage each other in the form of a developed thread so that the driving in of the wedge has the effect of forcing two adjacent segments together. By this arrangement, the connection is self-locking and there is hardly any risk that the connection will loosen.

In accordance with still another feature of the present invention, latching elements are provided in the closure area so that the segments can be held together temporarily before the final tightening. Thus, the segments are first inserted into each other manually and locked in place. Then the loose assembly of the individual segments is brought up to the desired degree of pretension by driving in the wedges one after the other.

In accordance with still another feature of the present invention, the wedges can be provided with a latching area which guarantees that the connection will not loosen unintentionally.

To facilitate preassembly, removable stops can be used which allow the segments to be inserted into one another just to the point that the temporary latching system responds. Thereafter, when the segments are ready to be tightened, the stops are removed and then the segments can be pushed into one another in a desired way.

BRIEF DESCRIPTION OF THE DRAWINGS

These and other objects of the present invention and the various features and details of the operation and construction thereof are more fully set forth with the reference to the accompanying drawings, wherein.

DETAILED DESCRIPTION OF THE PREFERRED EMBODIMENT

Figure 1:
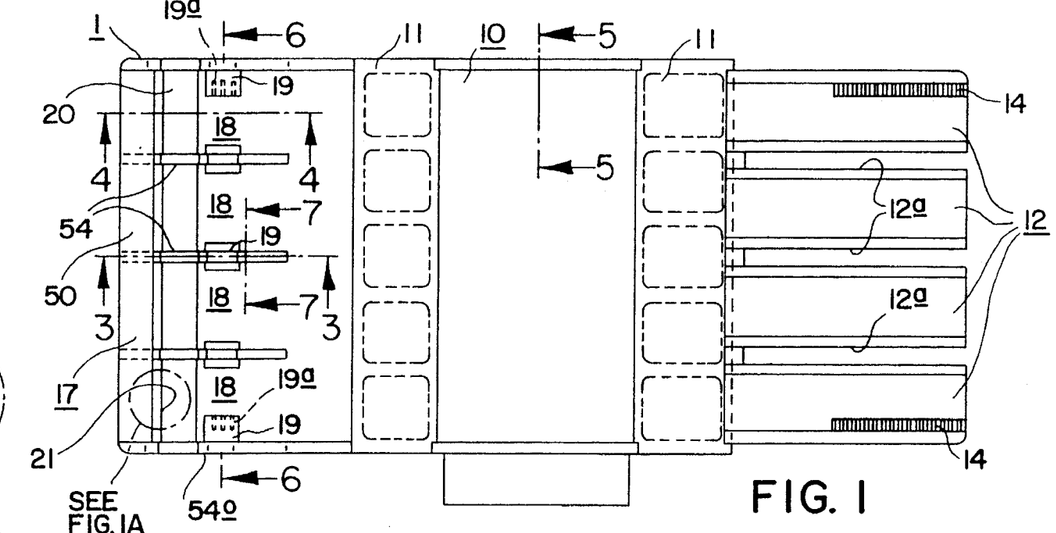
FIG. 1 is a plan view of a sliding skid ring segment in accordance with the present invention.
Figure 1A:
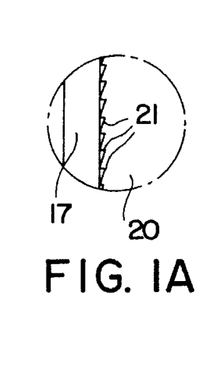
FIG. 1a is an enlarged fragmentary plan view of the detail contained within the dot and dash circle of FIG. 1.
Figure 2:
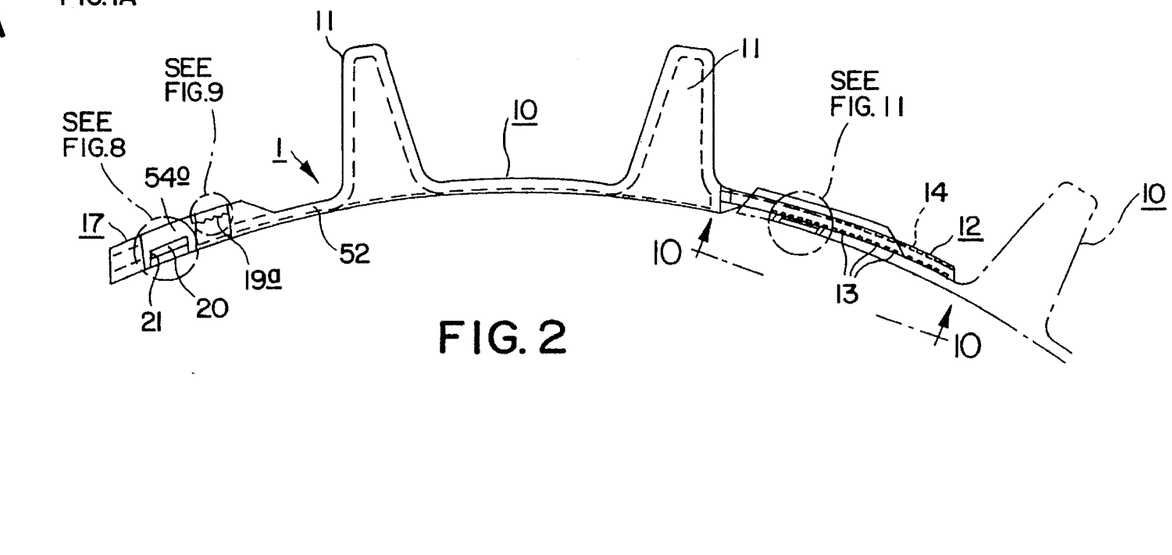
FIG. 2 is an elevational view of FIG. 1 showing in dot and dash lines an outline fragment of a second skid ring segment attached to the first segment.
Figure 3:
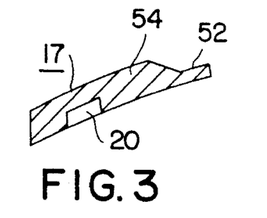
FIG. 3 is a fragmentary sectional view taken on the lines 3—3 of FIG. 1 showing details of a dividing wall for one of the four insertion slots.
Figure 4:
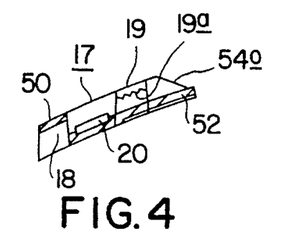
FIG. 4 is a fragmentary sectional view taken on the lines 4—4 of FIG. 1 showing additional details of the insertion slots.
Figure 5:
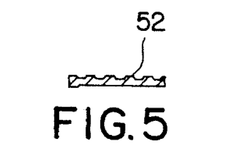
FIG. 5 is a fragmentary sectional view taken on the lines 5—5 of FIG. 1 showing a ribbed profile for the body of the ring segment.
Figure 6:
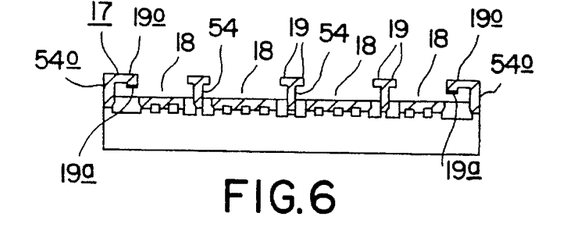
FIG. 6 is a sectional elevational view taken on the lines 6—6 of FIG. 1 showing details of the four insertion slots.
Figure 7:
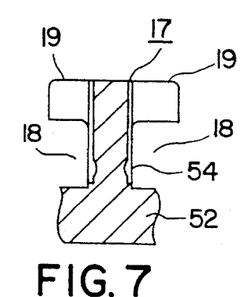
FIG. 7 is an enlarged fragmentary sectional elevational view taken on the lines 7—7 of FIG. 1 showing details of an insertion slot divider with tab hold down blocks.
Figure 8:
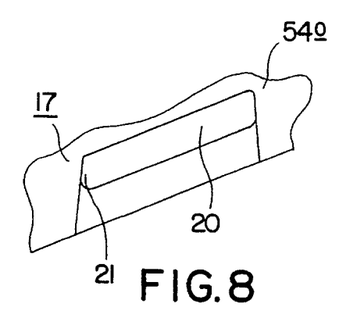
FIG. 8 is an enlarged fragmentary end elevational view of the detail contained within the dot and dash circle of FIG. 2 showing details of the channel into which a locking wedge is driven.
Figure 9:
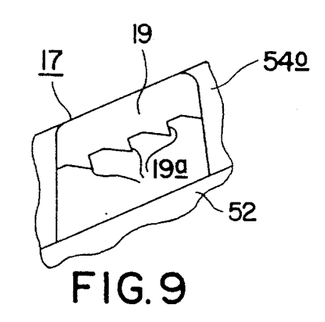
FIG. 9 is an enlarged fragmentary elevational view of the detail within the dot and dash circle of FIG. 2 showing details of the tooth configuration on the underside of the hold members.
Figure 19:
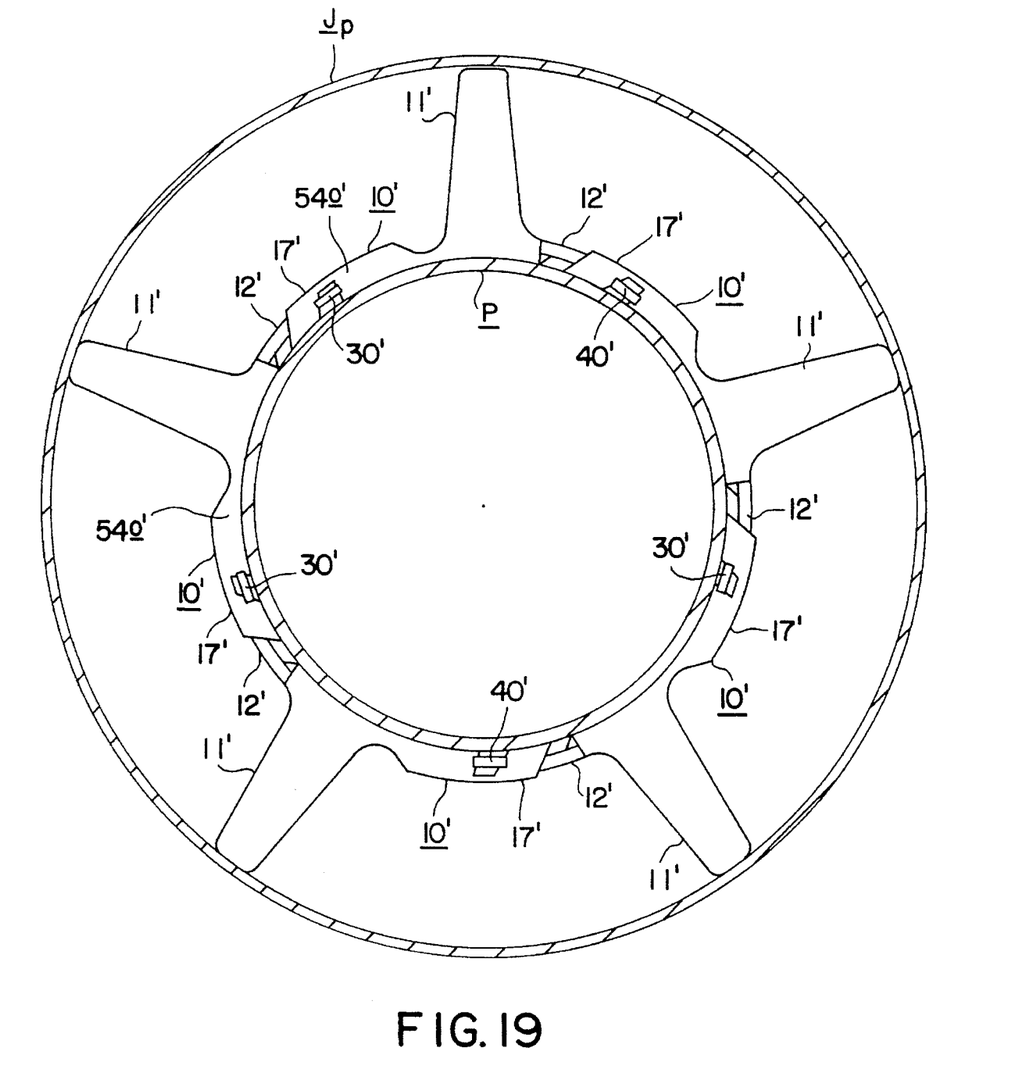
FIG. 19 is a sectional end elevational view of the ring segments shown in FIG. 18 actually joined together in a locking engagement with one another forming a tensioned frictionally gripping band of sliding skid ring segments around the circumference of the pipe.

Referring now to the drawings and particularly to FIG. $1^a$ thereof, there is shown a sliding skid ring assembly in accordance with one version of the present invention installed between a pipe P and an outer jacket pipe $J_p$. Considering first the details and arrangement of the principal embodiment, and with particular reference to FIGS. 1, $1^a$ and 2 thereof, the sliding skid ring 1 of the present invention comprises a plurality of identical segments 10. Each segment 10 carries an outwardly directed sliding skid 11 and depending on the design or diameter of the pipe, the segment 10 will carry one or more outwardly directing sliding skid 11. For example, for pipes of larger diameter, segments 10 which carry two or more sliding skids 11 are used. (See FIG. 1) For pipes of small diameters, segments 10' having only one sliding skid 11' are used. (See FIGS. 15 and 19)

Segment 10 has a radial section on one side, which has the form of a tab 12. In the exemplary embodiment according to FIG. 1, four tabs 12 are provided, whereas in the exemplary embodiment according to FIG. 15, three tabs 12' are provided. On the other side, an additional radial section is provided, which is designed as a closure part 17. In coordination with the number of tabs 12, closure part 17 has insertion slots 18, into which tabs 12 of a neighboring segment are pushed.

Figure 10:
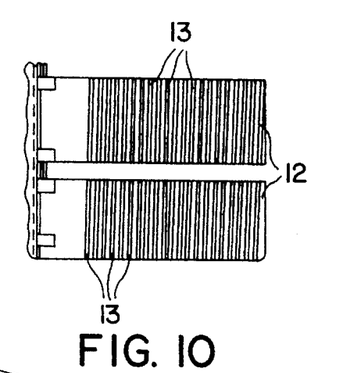
FIG. 10 is a fragmentary bottom plan view taken on the lines 10—10 of FIG. 2 showing details of two of the four tabs and their associated angularly displaced grooves.
Figure 11:
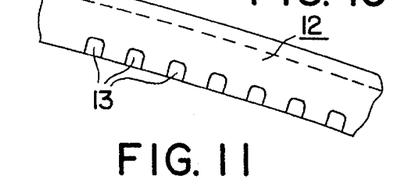
FIG. 11 is an enlarged fragmentary end elevational view of the detail contained within the dot and dash circle of FIG. 2 showing details of the grooves in the tab, FIG. $12^a$ is a side elevational view of a long wedge, FIG. $12^b$ is an enlarged end elevational view taken on the lines $12^b$—$12^b$ of FIG. $12^a$, FIG. $12^c$ is an enlarged fragmentary side elevational view showing the toothed configuration running along one edge of the wedge, FIG. $12^d$ is an enlarged fragmentary view of the detail contained within the dot and dash circle of FIG. $12^a$ showing an index mark used when driving the wedge only part way into channel 20, FIG. $13^a$ is a side elevational view of the short wedge used in an alternated sequence with the longer wedge, FIG. $13^b$ is an enlarged end elevational view taken on the lines $13^b$—$13^b$ of FIG. $12^a$, FIG. $13^c$ is an enlarged fragmentary elevational view showing the toothed configuration running along one edge of the wedge (teeth 41 cooperate with teeth 21 of channel 20, FIG. $14^a$ is an enlarged fragmentary end elevational view of a skid segment as shown in FIGS. 1 and 2 but slightly modified by reason of a vertically extending slots formed in the insertion slot partitions to accommodate insertion stop keys, FIG. $14^b$ is an elevational view of an insertion stop key viewed on the lines $14^b$—$14^b$ of FIG. $14^a$.

Tabs 12 carry on their undersides a plurality of grooves 13, which are parallel and equidistant. (See FIG. 10) These are not aligned precisely in the axial direction. On the contrary, they proceed in a direction slightly different from that. They cooperate with correspondingly designed grooves 33, 43 in a wedge 30, 40 see FIG. 12a and 13a, in the manner of a developed screw/nut connection. For this purpose, a guide groove 20 is provided in closure part 17. This groove 20 is located in the engagement area of tabs 12 and extends in the axial direction. Wedge 30, 40 is designed to slide axially in guide groove 20. The displacement of wedge 30, 40 therefore brings about the radial displacement of two adjacent segments 10. Thus, a loosely preassembled ring of several identical segments 10 can be pushed over the pipe, or the segments can be assembled directly around the pipe, and then wedges 30, 40 are driven in to cream a degree of radial pretension sufficient to achieve the desired nonpositive connection between the sliding skid ring 1 and the pipe. The tension can be increased gradually and brought to the desired value by striking each wedge 30, 40 several times over the course of several passes around the ring.

The desired effect can be achieved by the use of a single type of wedge, namely, a tightening wedge 30. This wedge is of considerable length, so that, when it is driven into guide groove 20, two adjacent segments 10 can be brought together over a relatively long distance. It has been found advantageous, however, to make only every second connection with a tightening wedge 30. The other connections can then be locked with a fastening wedge 40. This is shorter than tightening wedge 30, and it also has fewer grooves 43. Each fastening wedge 40 is inserted all the way into guide groove 20 in the axial direction and holds this in the position reached upon complete insertion. The pretension is created by tightening wedges 30, which are driven in at the other connecting points. This has proven to be a time-saving procedure especially in the case of large diameter pipes, inasmuch as the large number of segments 10 required to complete the ring means that there will still be sufficient opportunity for adjustment around the periphery.

Wedges 30, 40 are provided on their sides with a sawtooth-like latching area 31, 41, which, in the driven state, is engaged with a correspondingly designed, mating latching area 21 in guide groove 20 and thus prevents the unintentional loosening of wedges 30, 40.

To facilitate preassembly, that is, to construct the loose ring structure, one or more tabs 12 can be provided with latching teeth 14. Latching teeth 14 cooperate with latching block teeth 19a on latching blocks 19 on closure part 17. To produce the loose ring structure, tabs 14 are pushed into insertion slots 18 of closure part 17 at least far enough until the first latching teeth 14 engage in latching block 19 to hold two adjacent segments 10 together temporarily. Thus the connecting point is locked, but, if necessary, it can still be taken apart again relatively easily. To fit the ring to the actual diameter of the pipe in question, tab 12 can be pushed further into latching slots 18 one after the other at the connecting point and latched in any desired intermediate position.

As an insertion end stop for preassembly, it is possible to use a removable stop key 50 in the area of closure part 17. This serves only as a temporary insertion limiter, i.e., only during the preassembly procedure, and it is removed after preassembly, so that it will not interfere with the further radial displacement of the two segments 10 toward each other for the purpose of tightening the ring.

Building on the basic principle described above, it is possible in easy logical steps to realize additional variants of a connection between identical segments. In particular, the arrangement of grooves, latching elements, and wedges can be varied over a wide range without departing from the basic principle of the invention. In particular, it is also possible to design the connecting points in more compact manner by moving latching block 19 directly up to guide groove 20, as shown by away of example in FIG. 15.

Figure 12A:
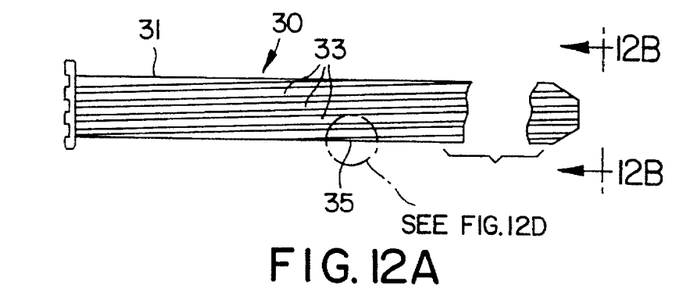
Figure 12B:
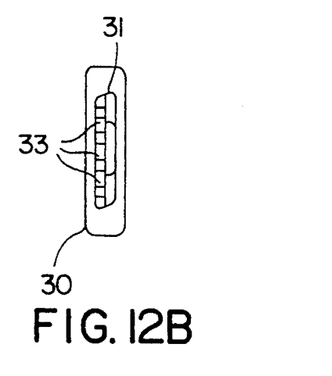
Figure 12C:
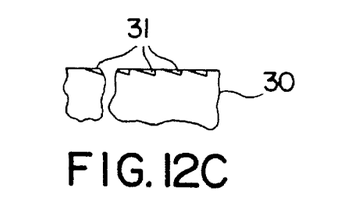
Figure 12D:
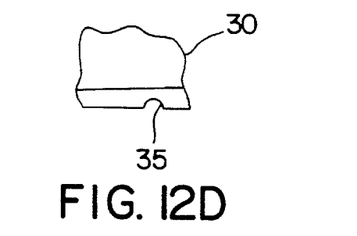
Figure 13A:
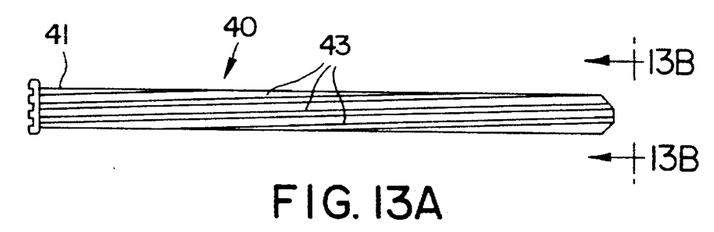
Figure 13B:
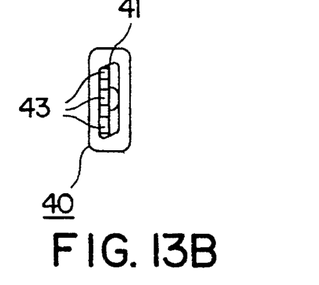
Figure 13C:
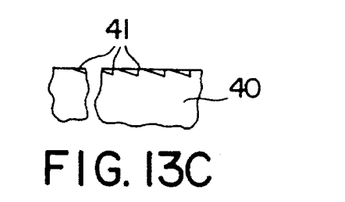
Figures 14A, 14B:
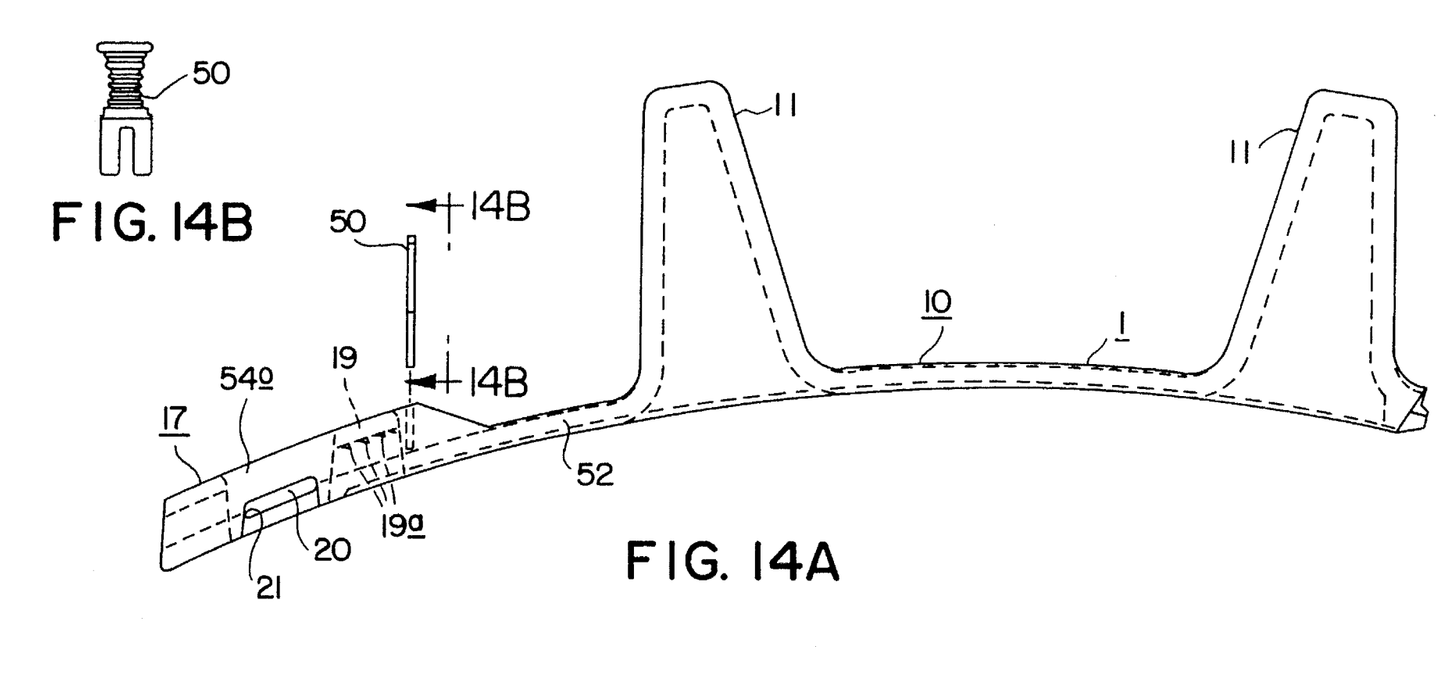

Consider now assembly of skid ring segments 10 of the type described above around a pipe P to support it inside a pipe jacket $J_p$. For a given sized pipe, first determine the approximate number of segments 10 needed to circumscribe the pipe P. The segments 10 are then assembled loosely in side-by-side relation in a circular array in the manner shown in FIG. 2. Note that as each segment 10 is added, the tabs 12 of one segment engage in the insertion slots 18 of the closure portion 17 of the adjacent segment 10. Note that in this position, the teeth 14 of the tabs 12 loosely interengage with the teeth $19^a$ of the blocks $19^o$. When a circular array of segments 10 have been positioned to circumscribe the pipe P loosely, the various segments may still be adjusted relative to one another to position them properly for subsequent locking interengagement. The wedges of the type shown in FIGS. 12a and 13a are then inserted in the groove 20 for final locking. As the wedges are driven into the groove 20, the developed helical grooves of the wedges cooperatively interengage with the developed helical grooves 13 on the underside of the tabs 12 to pull the adjacent segments 10 tighter together to snub them firmly against the pipe P. Upon connection of all of the segments 10 in this fashion, the segments 10 form an interconnected tensioning band circumscribing the pipe P. It is noted that the short wedge does not pull the segments together quite as tightly as the long wedge and for the best results in the overall assembly, it is preferred to use a long wedge in every third instance. It is noted that one side edge of each of the wedges has a series of teeth 31 and 41 which cooperate with the row of teeth 21 in the channel 20 of the closure end 17 to hold the wedges in place. In addition, with reference to FIG. $12^d$, the long wedge 30 has a small index mark 35 out in the edge opposite the toothed edge 31. The long wedges 30 are driven to this index mark before final tightening of the assembly.

Figure 15:
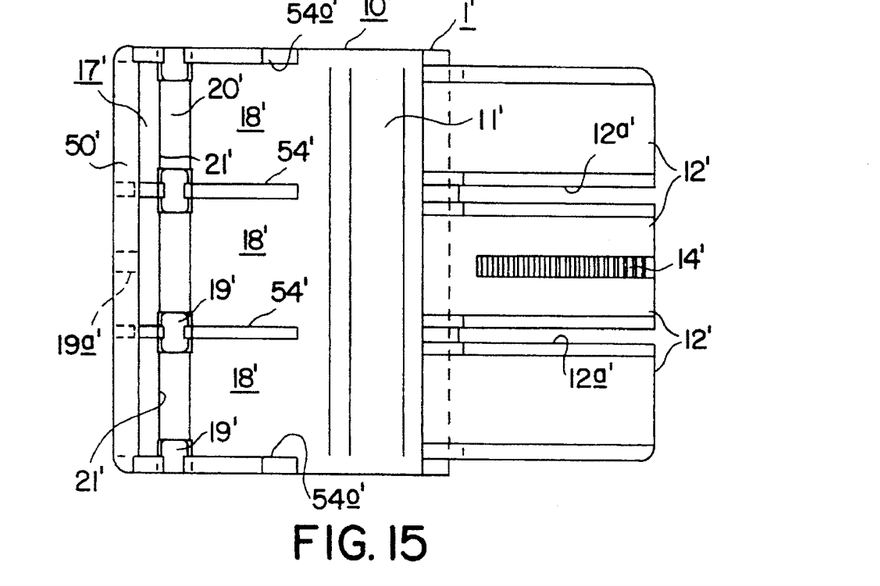
FIG. 15 is a plan view of a modified skid ring segment in accordance with the present invention.
Figure 16:
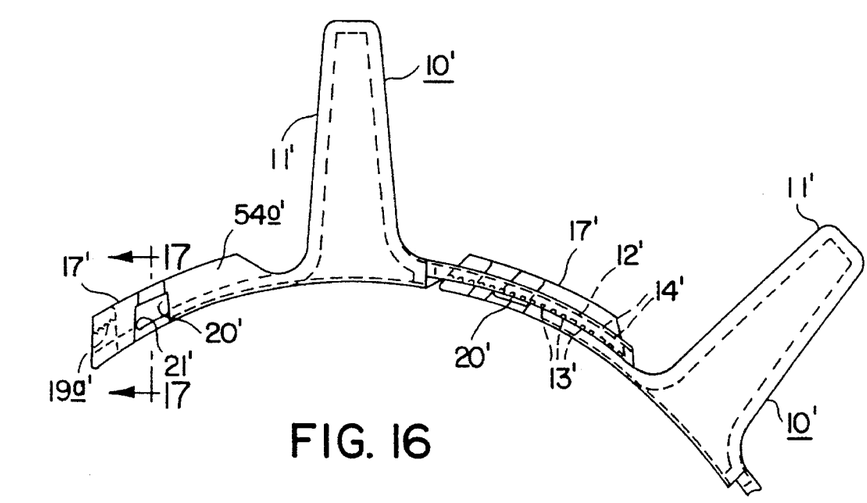
FIG. 16 is an end elevational view of FIG. 15.
Figure 17:
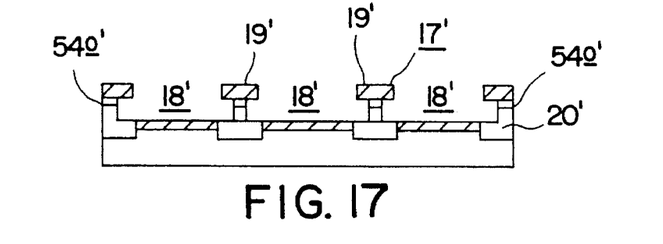
FIG. 17 is a sectional elevational view taken on the lines 17—17 of FIG. 16 showing details of the insertion slots at the closure end of the ring segment.
Figure 18:
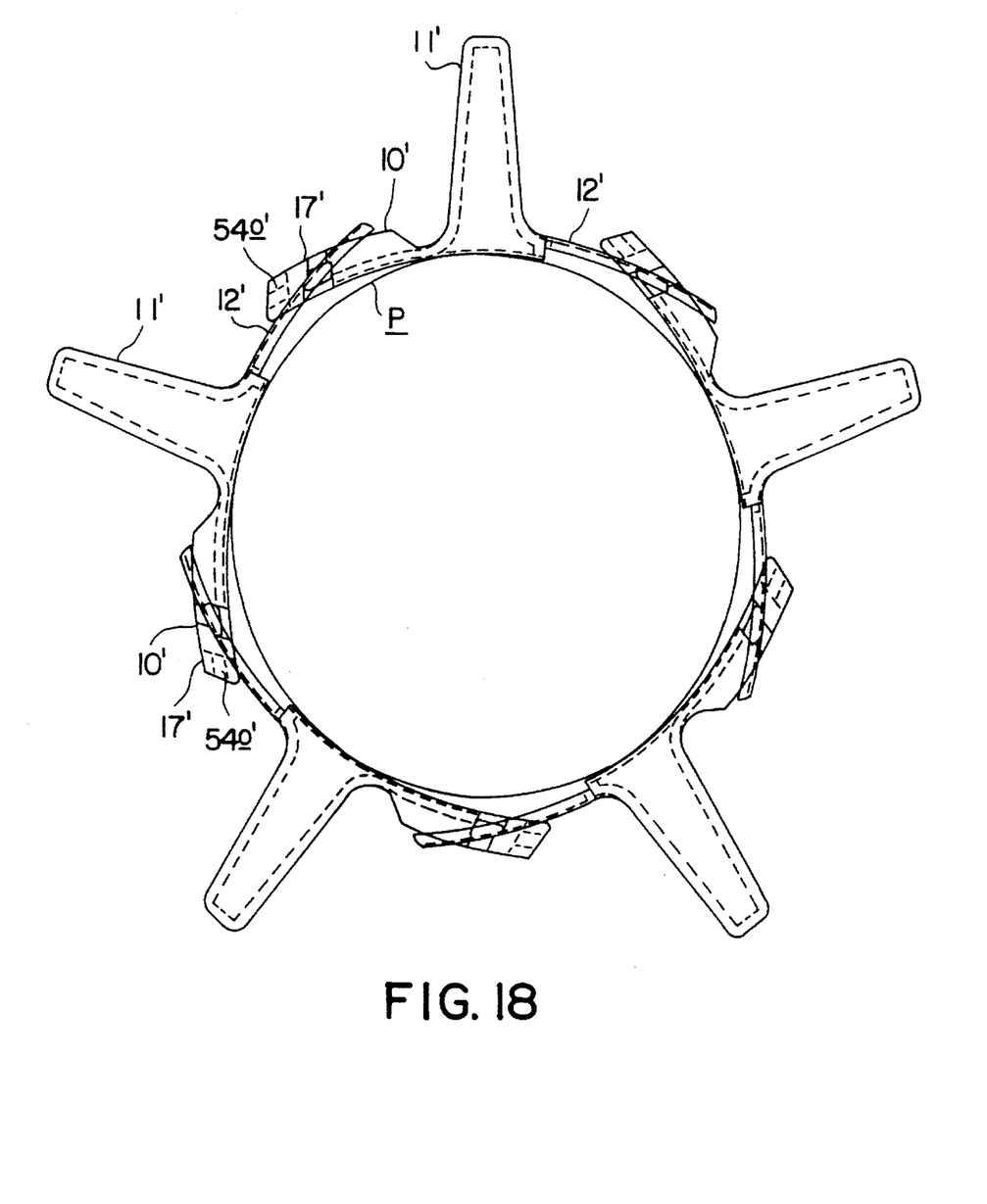
FIG. 18 is a schematic end elevational view illustrating the number of ring segments required to encircle a pipe of the diameter shown in the drawing.

There is shown in FIGS. 15–19 inclusive a modified embodiment of sliding skid ring assembly in accordance with the present invention. Like parts of this embodiment have been marked with the same reference numeral with the addition of a prime ('). Thus, the assembly includes a plurality of identical segments 10', each segment having a radially outwardly directed skid 11'. The segments are connected in a circular array. Considering now the details of each segment more specifically and with particular reference to FIGS. 15–17 inclusive, each segment 10' comprises three axially extending tabs 12' which as illustrated in FIG. 15 are separated by a gap or groove $12^{a'}$ and a closure end or part 17'.

The tabs project axially in one direction as shown in FIG. 15 from the skid 11' and the closure part generally designated by the numeral 17 projects in the opposite axial direction from the skid 11'. The closure part as illustrated in FIGS. 3–9 inclusive and specifically in FIG. 4 comprises a raised outer band 50 at the outer terminal end, an inner wall or body portion 52 spaced radially inwardly from the outer band 50 and a series of circumferentially space axially extending upstanding lane dividers 54 which define the lanes 18. The lane dividers 5,4 include a pair of outer end walls $54^o$. Each of the interior lane dividers 54 has a hold down block 19. It is noted that the hold down block 19 for the interior lane dividers 5,4 straddles the lane divider to overlie the adjacent insertion slots 18. The outer hold down blocks $19^o$ have an inwardly projecting leg portion having a series of teeth 19a confronting the end channels 18 in the manner shown in FIGS. 6 and 9. A axial extending slot 20 is formed on the outer surface of the inner wall or body portion 52 for the function of which will be described hereafter.

There is shown in FIGS. 15–19 inclusive a modified form of the skid ring segments in accordance with the present invention. A number of the parts of the segments are identical to those described previously and thus the same reference numbers have been applied and a prime (') added. However in the present instance, each segment 10 has only one radially outwardly directed sliding skid 11' and only three tabs 12' and only three insertion slots 18'. In the present instance, there is a different army of interengaging teeth to hold the segments together as compared with teeth 19a and 14. In accordance with this embodiment, the center tab 12' has a series of axially extending teeth 14' on their upper face which as illustrated in FIG. 15, have a progressive spacing which diminishes from the outer terminal ends of the tabs 12' toward the radial skid 11'. Further, the underside of the inner band 50 of the closure part 17' has a short row of teeth 19a which cooperates with the teeth 14' to lock the parts in place in the manner described above in connection with the teeth 19a and 14. In all other respects, the parts are assembled in the same way utilizing wedges to lock the ring segments in place.

A sliding skid ring 1 for a pipe, for example, a gas line or waste water pipe, to be installed underground inside a jacket pipe, consists of a plurality of identical segments 10. Each segment 10 has on one side a radial section in the form of tabs 12, which engage in correspondingly designed radial section 17 of an adjacent segment 10. The tabs 12 are provided with slanted grooves 13, which cooperate with appropriately designed grooves in a wedge in the manner of a developed screw/nut connection, the two adjacent segments 10 being moved toward each other when the wedge is driven axially into a guide groove 20. The sliding skid ring 1 is made completely of nonmetallic mateddais, so that no corrosion phenomena of any kind can occur. In addition, because the segments 10 are resilient, they can be fitted to pipes of a wide range of different diameters, so that the number of individual parts which must be kept on hand is extremely small. It is also possible to premount the sliding skid rings 1 and to tighten them reliably on the pipe.

What is claimed is:

1. Sliding skid ring for a pipe member, to be laid underground inside a jacket pipe, consisting of at least two segments, connected to each other by means of tightening elements, held under pretension against the pipe member in a nonpositive manner, and carry outward-pointing sliding skids, characterized in that; the sliding skid ring (1) is comprised of several identical segments (10); each segment (10) being provided on one side with a radial section in the form of one of more tabs (12) and, on the opposite side, with another radial section in the form of a closure part (17) having one or more insertion slots (18) designed to accept the tabs, the tabs (12) of an adjacent segment (10) being engaged in the slots; the tabs (12) have a plurality of parallel and equidistant grooves (13), which are at a slant of a few degrees to the axial direction; the closure part (17) has, in the engagement area of the tabs (12), an axially oriented guide grooves (20) for a tongue-like wedge (30, 40), which is inserted therein; the wedge (30, 40) having grooves (33, 43), which are oriented to correspond with the grooves (13) in the tabs (12) and are in engagement therewith; the wedge (30, 40) being driven axially into the guide grooves (20) until the two adjacent segments (10) are tightened together and the sliding skid ring (1) is thus held pressed against the pipe member.

2. Sliding skid ring according to claim 1, characterized in that, for the preassembly of two adjacent segments (10), at least one of the tabs (12) has latching teeth (14) on the side facing away from the grooves (13), these teeth cooperating with latching blocks (19) on the closure part (17).

3. Sliding skid ring according to claim 1 or claim 2, characterized in that, as insertion stop for preassembly, a removable stop key (50) can be loosely attached in the area of the closure part (17).

4. Sliding skid ring according any of claims 1 or 2, characterized in that the wedges (30, 40) are provided on the side with a sawtooth-like latching area (31, 41) and in that the guide groove (20) is provided with a mating latching area (21).

5. Sliding skid ring according to claim 3, characterized in that the wedges (30, 40) are provided on the side with a sawtooth-like latching area (31, 41) and in that the guide groove (20) is provide with a mating latching area (21).

\* \* \* \* \*

UNITED STATES PATENT AND TRADEMARK OFFICE
CERTIFICATE OF CORRECTION

PATENT NO. : 5,496,134
DATED : March 5, 1996
INVENTOR(S) : Siegfried Goehner

It is certified that error appears in the above-indentified patent and that said Letters Patent is hereby corrected as shown below:

In column 2, line 1, please correct the word "tings" to read --rings--.

In column 5, line 11, please correct the word "cream" to read --create--.

In column 7, line 9, please correct the word "army" to read --array--.

In column 7, line 33, please correct the word "mateddais" to read --materials--.

Signed and Sealed this

Twenty-third Day of July, 1996

Attest:

BRUCE LEHMAN

Attesting Officer

Commissioner of Patents and Trademarks